(12) United States Patent
Velho et al.

(10) Patent No.: US 9,424,826 B2
(45) Date of Patent: Aug. 23, 2016

(54) METHOD FOR REPRESENTING MUSICAL SCALES AND ELECTRONIC MUSICAL DEVICE

(71) Applicant: ASSOCIACAO INSTITUTO NACIONAL DE MATEMATICA PURA E APLICADA, Rio de Janeiro (BR)

(72) Inventors: Luiz Carlos Pacheco Rodrigues Velho, Rio de Janeiro (BR); Marcelo Cicconet, Rio de Janeiro (BR); Paulo Cezar Pinto Carvalho, Rio de Janeiro (BR)

(73) Assignee: ASSOCIACAO INSTITUTO NACIONAL DE MATEMATICA PURA E APLICADA, Rio de Janeiro (BR)

( * ) Notice: Subject to any disclaimer, the term of this patent is extended or adjusted under 35 U.S.C. 154(b) by 0 days.

(21) Appl. No.: 14/817,144

(22) Filed: Aug. 3, 2015

(65) Prior Publication Data

US 2015/0371621 A1    Dec. 24, 2015

Related U.S. Application Data

(63) Continuation of application No. 13/697,468, filed as application No. PCT/BR2011/000135 on May 12, 2011, now Pat. No. 9,099,013.

(30) Foreign Application Priority Data

May 12, 2010    (BR) ...................................... 1001395

(51) Int. Cl.
*G04B 13/00*    (2006.01)
*G10H 1/34*    (2006.01)
*G09B 15/02*    (2006.01)
*G09B 15/00*    (2006.01)
*G06F 3/041*    (2006.01)

(52) U.S. Cl.
CPC ................ *G10H 1/34* (2013.01); *G06F 3/041* (2013.01); *G09B 15/003* (2013.01); *G09B 15/02* (2013.01)

(58) Field of Classification Search
CPC ................ G10H 2220/096; G10H 2220/241; G06F 3/0416; G06F 3/041; G06F 3/0488; G06F 2203/04104
See application file for complete search history.

(56) References Cited

U.S. PATENT DOCUMENTS

| | | | |
|---|---|---|---|
| 2003/0024375 A1 | 2/2003 | Sitrick | |
| 2010/0287471 A1 | 11/2010 | Nam et al. | |
| 2011/0100198 A1* | 5/2011 | Gatzsche | G10H 1/0008 84/615 |
| 2011/0203445 A1 | 8/2011 | Stranger | |
| 2012/0174735 A1* | 7/2012 | Little | G10H 1/0008 84/613 |
| 2012/0297958 A1* | 11/2012 | Rassool | G06F 3/0481 84/609 |

(Continued)

*Primary Examiner* — Marlon Fletcher
(74) *Attorney, Agent, or Firm* — Knobbe Martens Olson & Bear LLP

(57) ABSTRACT

A method represents musical scales by means of tiles, including pentatonic scales (arbitrary scales with five notes per octave), heptatonic scales (arbitrary scales with seven notes per octave), Major blues and Minor blues scales (specific scales with six notes per octave). An electronic musical device has an interface that uses this representation. The device uses a multi-touch interface with or without strings, which allows the musician to concentrate on the melodic line only, making it easier to improvise and perform music composed in one of the scales. The representation differs from the traditional interfaces on string instruments (such as a guitar) in that only the notes of a given scale (with five, six or seven notes per octave) can be played.

28 Claims, 15 Drawing Sheets

(56) References Cited

U.S. PATENT DOCUMENTS

| | | | |
|---|---|---|---|
| 2013/0025437 A1* | 1/2013 | Serletic | G10H 1/0025 84/634 |
| 2013/0186260 A1* | 7/2013 | Velho | G09B 15/003 84/645 |
| 2014/0083279 A1* | 3/2014 | Little | G10H 1/0008 84/609 |

* cited by examiner

Unright angle

Right angle 1
2
3
4
5
6

METHOD FOR REPRESENTING MUSICAL SCALES AND ELECTRONIC MUSICAL DEVICE

CROSS-REFERENCE TO RELATED APPLICATIONS

This application is a continuation of U.S. application Ser. No. 13/697,468 filed on Apr. 3, 2013 as the U.S. National Phase under 35. U.S.C. §371 of International Application PCT/BR2011/000135, filed May 12, 2011, which claims priority to Brazilian Patent Application No. PI1001395-4, filed May 12, 2010. The disclosures of the above-described applications are hereby incorporated by reference in their entirety.

FIELD OF THE INVENTION

The present invention relates to a method for representing musical scales by means of tiles, and to an electronic musical device with an interface that uses such representation. More specifically, the device employs a multi-touch interface, with or without strings.

BACKGROUND OF THE INVENTION

The multi-touch technology itself is not new. Whether in the field of mobile phones and portable music players, or in the music field, said technology is widely known. In the first case, the public had access thereto, in a broadly manner, through the use thereof on the iPhone and iPod Touch, devices developed by Apple, applicant of the Multi-Touch patent. In the second case, for example, the Lemur can be cited, a music mixer with multi-touch interface, developed in 2004 by French manufacturer Jazz Mutant, a pioneer in this segment. Nowadays the Lemur (device fully controlled by the movement of the fingers) already has its successor: the Dexter.

In fact, there were several musical interfaces that have emerged since the introduction of computers in modern life, which does not mean that interfaces for analogue instruments were not available prior to that.

In patentary literature, there were found some documents relating to the subject described in the present invention without, however, anticipating or suggesting the scope thereof. Just as an example, the following documents are cited: the U.S. Pat. No. 7,479,949, owned by Apple, entitled Touch screen device, method, and graphical user interface for determining commands by applying heuristics; the U.S. Pat. No. 7,619,618, also owned by Apple, entitled Identifying contacts on a touch surface; the Brazilian application PI0706177-3, entitled "Célula portátil de dispositivos interativos para múltiplos usuários"; the U.S. application US2007198926, entitled Devices and methods of controlling manipulation of virtual objects on a multi-contact tactile screen; the international application WO2005091104, entitled Controller involving manipulation of virtual objects on a multi-contact touch screen; the French patent FR2866726, entitled Computerized equipment e.g. music software, controlling process, involves generating clipart on screen placed under transparent multi-contact face plate, and delivering touch information by face plate during each acquisition phase; the European application EP1950649 A1, entitled Device for acquiring tactile information with sequential scanning; and the European patent EP1719047 B2, entitled Controller involving manipulation of virtual objects on a multi-contact touch screen.

Therefore, it is clear that there are already in the state of the art multi-dimensional interfaces both analog and digital.

The case of the most important analog interface is that of the button accordion. However, in the accordion, the alignment of notes takes place over non-orthogonal directions, while in the representation previously proposed the alignment takes place at right angles, according to the distinction presented in FIGS. 1A and 1B. In addition, the inventors are unaware of accordions of which interfaces have Major blues or Minor blues scales, as well as interfaces where the various pentatonic scales can be represented under the same two-dimensional configuration of notes, analogous fact occurs for heptatonic scales.

Thus, although technologies related to the development of multi-touch interfaces are known, the present inventors are unaware, yet, of the existence of: (i) a method that aims to represent pentatonic, heptatonic, Major blues and Minor blues musical scales using the technique to be described, (ii) or a multi-touch device with such interface.

Therefore, the present invention proposes a representation which differs from that of the accordion, as well as from other known two-dimensional musical interfaces.

Furthermore, the representation proposed by the present invention tends to be generic, since the same "point matrix" which sets the alignment of the points may represent several scales, which is only possible due to the fact that the interface is controlled by computer. The only reservation is that the scales must have the same number of notes.

SUMMARY OF THE INVENTION

It is an object of the present invention to provide a method which consists in the representation of certain musical scales (pentatonic, heptatonic, Major blues and Minor blues) in multi-touch devices. Another object of the invention is to provide a musical device of which interface is said representation.

In another aspect of the present invention, the proposed interface is of multi-touch and two-dimensional types.

These and other objects of the invention will be appreciated and better understood from the detailed description of the invention.

DESCRIPTION OF THE DRAWINGS

FIG. 20 B—Figure which shows implementation of the tiling idea for the Blues scale on a cell phone with multi-touch screen.

FIG. 23 B—Analogous to FIG. 20 A, for the representation of heptatonic scales.

DETAILED DESCRIPTION OF THE INVENTION

Figure 1A:
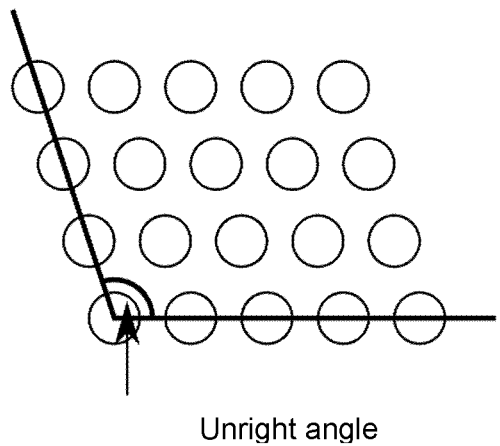
FIG. 1—Figure which shows that the distinction between the alignment of the notes is along a non-orthogonal direction (A), in the case of the accordion, and at right angles (B), in the representation previously proposed.
Figure 1B:
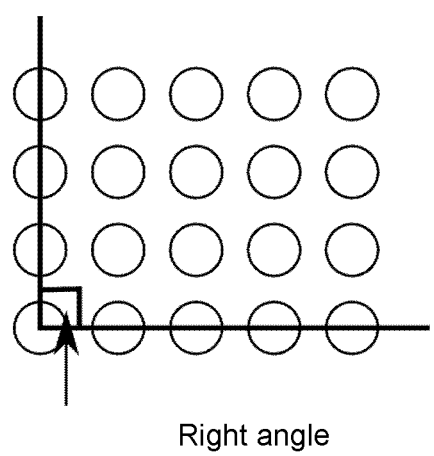

The present invention relates to a method for representing musical scales by means of tiles, for pentatonic scales (with five notes per octave), heptatonic scales (with seven notes per octave), Major Blues and Minor Blues scales (specific scales with six notes per octave), and to an electronic musical device of which interface uses such representation. More specifically, the device uses a multi-touch interface with or without strings, which allows the musician to concentrate on the melodic line only, making musical improvisations easier. The representation differs from the traditional interfaces on string instruments (such as a guitar, for example) in that only the notes of a given scale (with 5, 6 or 7 notes per octave) can be played.

Thus, the present invention is intended to provide alternatives to overcome the limitations of the state of art for the development of an electronic musical entertainment device with multi-touch and two-dimensional interfaces.

Multi-touch technology comprises: (i) hardware elements; (ii) software elements for sensing, sequencing and interpreting multiple movements of hands and fingers in a touchable image surface; and also (iii) elements of a material interaction that is just a connecting element between the hardware and software.

As a computer interface, for example, the multi-touch is used to enable regular touches in a single surface. The multi-touch can also accept as written "entry" using the fingertip. That is, with multi-touch all the ways of importand "entries"—with the exception of voice (i.e., handwriting, typewriting, writing by the mouse, etc.) are satisfied with a single sensing surface.

The arrangement of the multi-touch sensor must be on a flexible or rigid surface that may have arbitrary shape, size, thickness and material.

An interface intends, primarily, to make the computer to understand what musical note, played by the user, should be reproduced. It can be materialized by means of a multimedia keyboard, mouse, joystick, etc.

The use of software to simulate traditional musical instruments is a difficult task. Unfortunately, without special hardware components, the task of producing reasonable sounds becomes uncomfortable, since neither the mouse nor the keyboard are suitable interfaces for a musical performance.

Thus, since the computers are, nowadays, widely used in music production, they remain unable to be "touched" in the same way a guitar is played, for example.

Therefore, in order to overcome this and other disadvantages of the art, the inventors decided to develop a method that could enable the electronic device, such as a computer, also become a musical instrument. Such task is based on the technology, already known, of the multi-touch interfaces (or Multi-Touch) since said interfaces provide many of the effects desired by the inventors.

The "bend", for example, can be obtained by touching the screen and by the sliding of the fingers down and up, a movement that produces repeated vibrations. Thus, the fundamental frequency of a note can be changed, to a more bass or more treble direction, as the user, by clicking on the note, slides his finger along opposite directions. For example: sliding up increases the fundamental frequency—making the sound more treble—and sliding down decreases—making the sound more bass. Therefore, it can be stated that the distance which the finger moves away from the original position of the touch determines the change of the fundamental frequency.

Besides allowing users to play multiple notes at the same time (which occurs very frequently in musical performances in general), by using a multi-touch interface, the inventors also wanted to develop a musical instrument that could simplify the performance of musical pieces composed in one of the mentioned scales or the improvisation of melodies on such scale. Consequently, it was concluded that the way of playing should be simplified by the presence of musical notes of the instrument wanted to be played under a tiling interface, in a manner more friendly than that presented on the reference instrument, especially by the non-presentation of notes outside the scale chosen. (See FIGS. 4, 5 and 6).

Therefore, it can be said that the present invention should be understood as a method of representing notes of certain musical scales, comprising the following steps, which can be better exemplified by the attached Figures.

Figure 2:
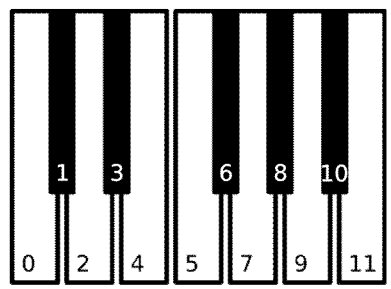
FIG. 2—Figure representing an octave of the piano (chromatic scale, i.e. 12 notes).
Figure 3:
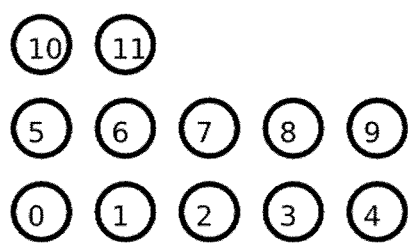
FIG. 3—Figure representing the chromatic scale on instruments tuned in fourths.
Figure 4:
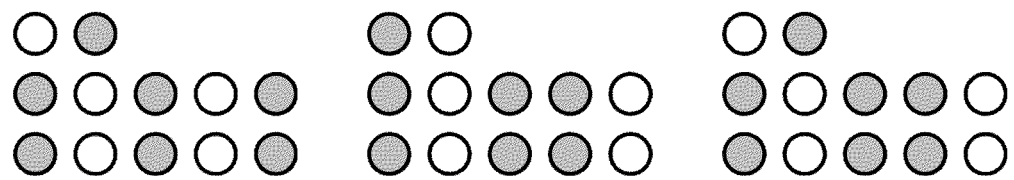
FIG. 4—Figure in which the points in gray scales represent the Major, Minor Natural and Minor Harmonic scales, according to the representation of FIG. 3.

Start looking at FIGS. 2 and 3. In these figures the notes having the same number have the same corresponding fundamental frequency. The representation of FIG. 3 naturally appears in instruments "tuned in fourths", as, for example, the guitar. This means that the note immediately above note 0 [i.e., note 5 (see FIG. 3)] is the "perfect fourth" of note 0; that the note immediately above note 5 (note 10) is the "perfect fourth" of note 5, and so on. The concept of "perfect fourth" simply means that the half-tone distance (i.e., in number of piano keys) is equal to 5. FIG. 4 shows three examples of heptatonic scales, represented by filled circles. The idea is to omit from the representation the unfilled circles, since said circles are out of scale and do not need (and usually should not) to be played. We, therefore, reach the representation of FIG. 5, where the note in gray represents the tonic (first note of the scale) and the unfilled notes represent the others. The order, from the tonic, is from left to right. For most of the known pentatonic scales, analogous procedure would result in which is shown in FIG. 6. The order, again, is from left to right and from bottom to top, from the tonic (filled circle).

Figure 5:
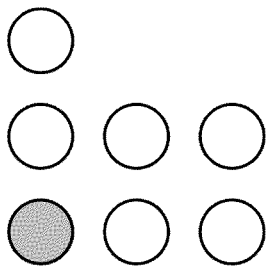
FIG. 5—Figure representing heptatonic scales (with seven notes per octave). In this representation the gray note represents the tonic (first note of the scale) and the blank notes represent the other notes of the scale.
Figure 6:
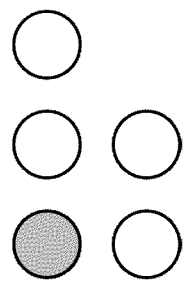
FIG. 6—Figure analogous to FIG. 5, in which the representation to pentatonic scales is reproduced (with five notes per octave).
Figure 7:
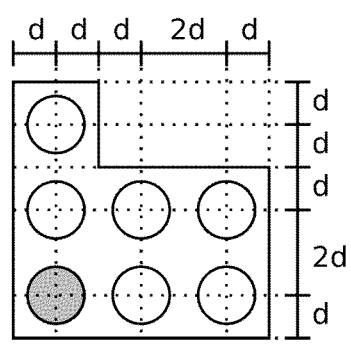
FIG. 7—Figure which shows, detailing the measurement relationship, the tile corresponding to the heptatonic musical scales. and "y" represent a positive distance, maybe different. The dotted lines which pass through the inner part of the circles cross at the center of the same. The notes are sorted from the tonic (note in darker gray) from left to right and from bottom to top, from where the highest note is the seventh note of the scale.
Figure 8:
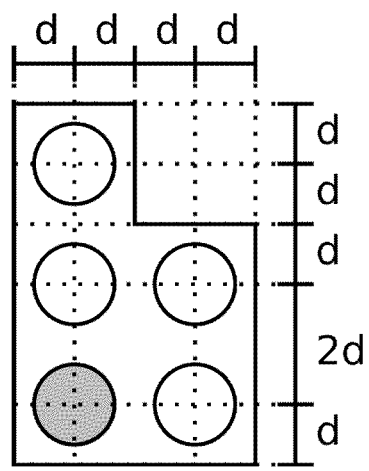
FIG. 8—Analogous to FIG. 7 for pentatonic scale.
Figure 9:
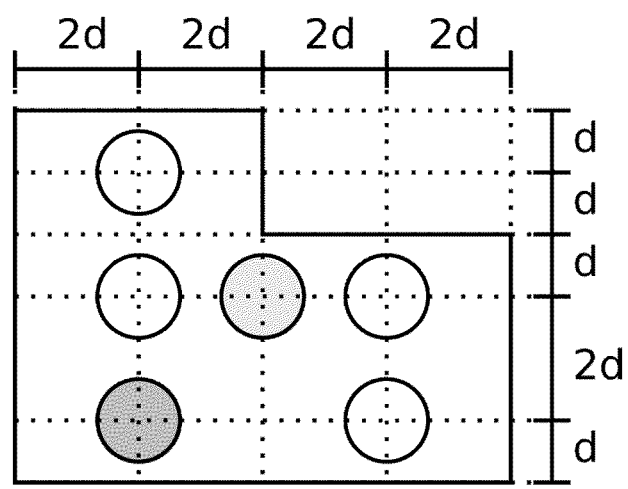
FIG. 9—Analogous to FIG. 7 for Minor Blues scale (comprising notes 0, 3, 5, 6, 7 and 10 of FIG. 3, where the focus is to note C).
Figure 10:
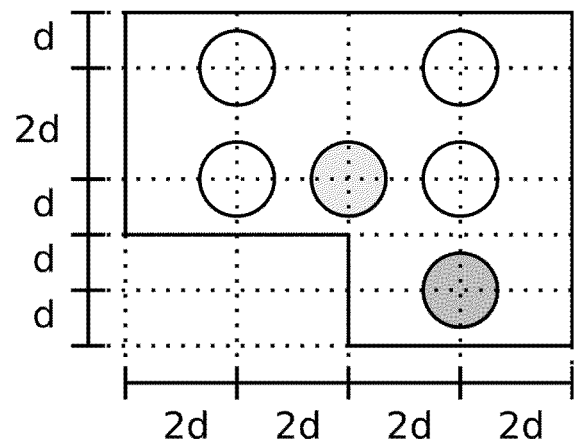
FIG. 10—Figure which shows the tile to Major Blues scale (comprising notes 0, 2, 3, 4, 7 and 9 of FIG. 3, where the focus is to note C).

In order to tile the plan with scale shapes as those of FIGS. 5 and 6, it is necessary to establish precise measures in such shapes. Here, we will use as example the Minor Blues scale, as being the construction for the other analogous scales, simply following the respective figures. The tile corresponding to the Minor Blues scale is shown in FIG. 9. In the case the tonic is note C (note 0 "zero", in FIG. 2), the scale comprises notes 0, 3, 5, 6, 7 and 10 of FIG. 2. These numbers also represent intervals of semi-tones with respect to the tonic note. For example: if the tonic note is a D (note 2 in FIG. 2), thus the scale consists of the notes which are at intervals of 0, 3, 5, 6, 7 and 10 distance semi-tone (to the right) from note D. In the tile, such notes are sorted from the tonic (note in darker gray)—from left to right and from bottom to top. Furthermore, it will be considered that the tonic note is a C, for simplicity. For other tonic notes, simply build the scale by using the notion of intervals, recently presented.

Figure 11:
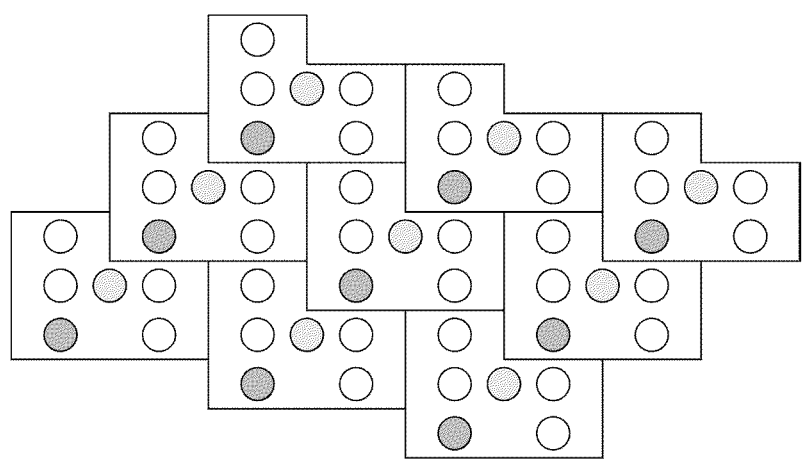
FIG. 11—Figure which shows the tiling for the Minor Blues scale—in said figure the darker gray point represents the tonic, and the lighter gray represents the so-called 'blue note' (a note which is highlighted in the Blues scale).
Figure 12:
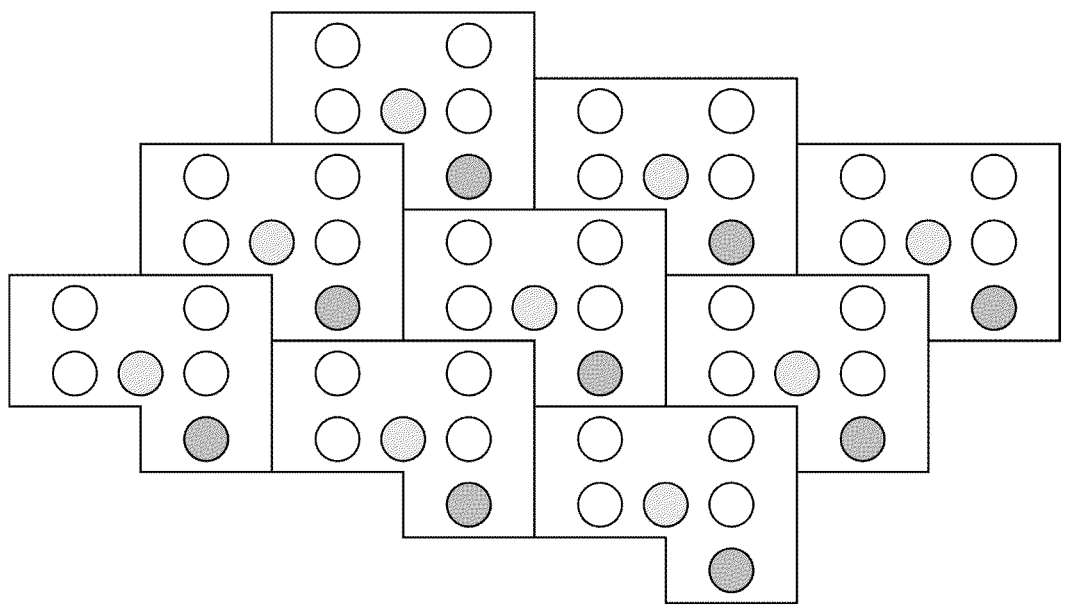
FIG. 12—Analogous to FIG. 11, for the Major Blues scale.

After taking the tile of the Minor Blues scale (FIG. 9), the next step consists in tiling the plan by using replicas of the chosen tile, of which procedure is shown in FIG. 11.

Figure 16:
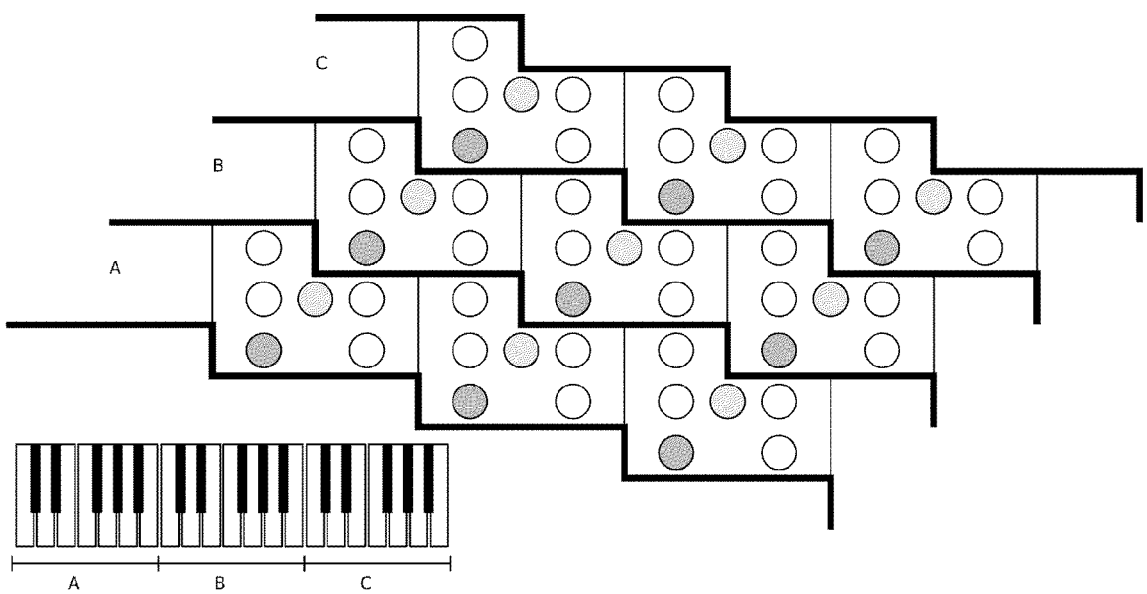
FIG. 16—Analogous to FIG. 15, for the Blues Minor scale.
Figure 17:
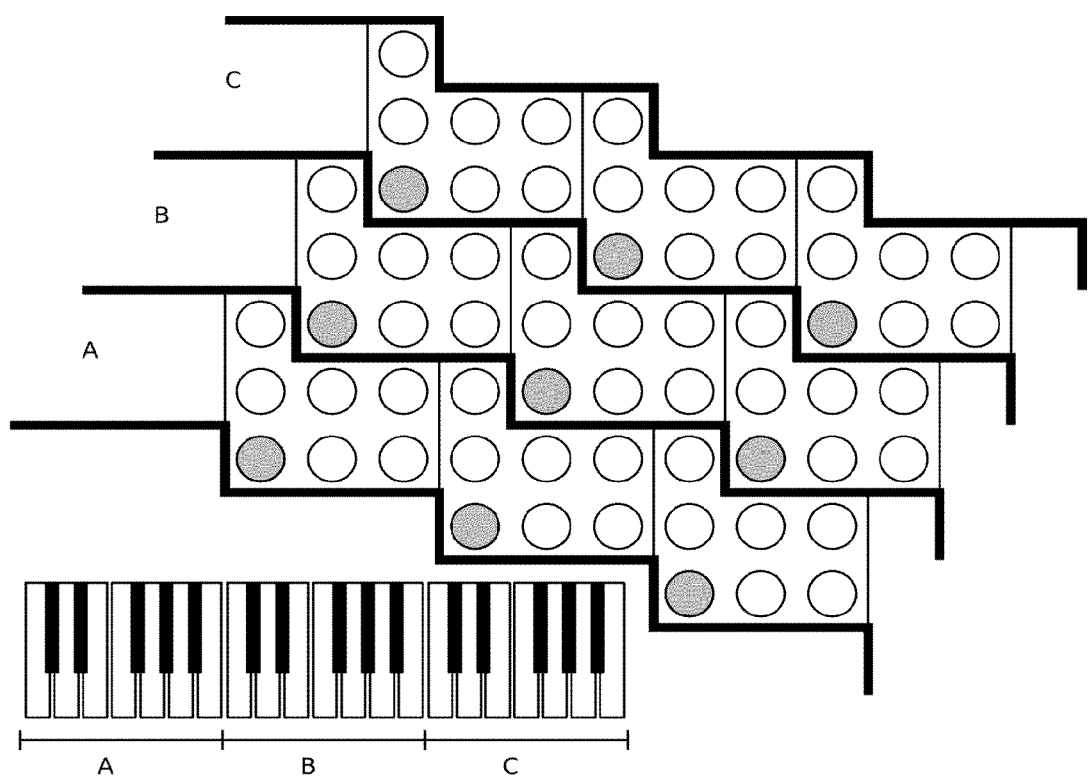
FIG. 17—Analogous to FIG. 15, for heptatonic scales.
Figure 18:
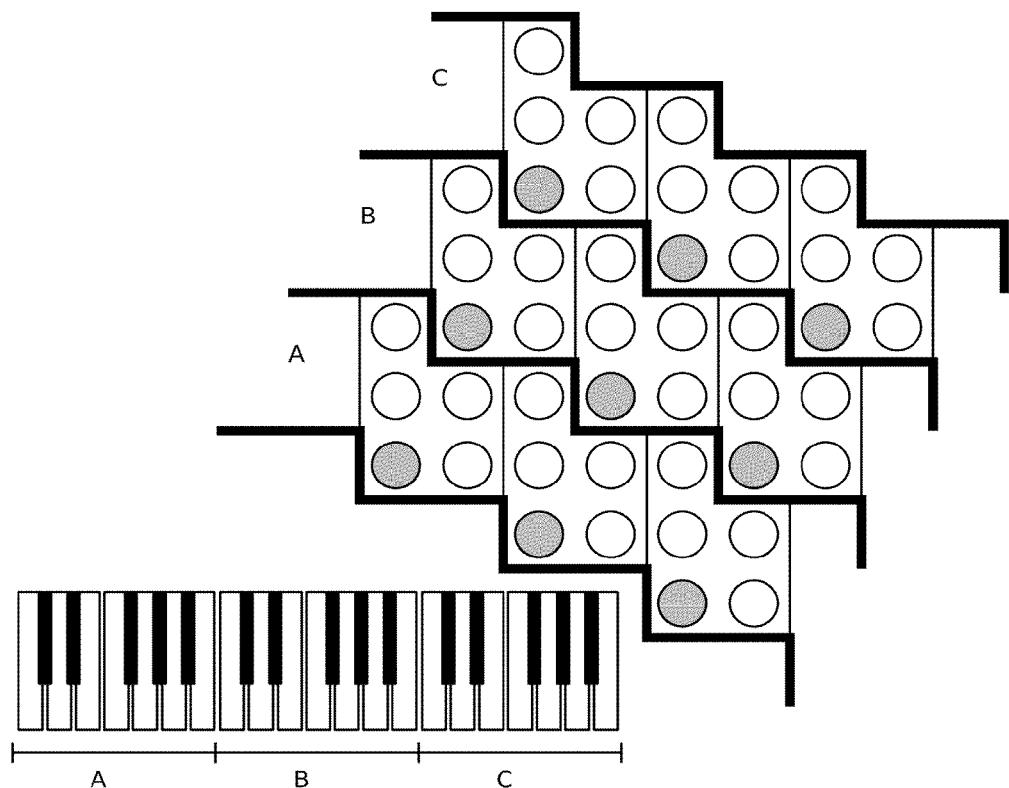
FIG. 18—Analogous to FIG. 15, for pentatonic scales.

FIG. 16 illustrates the distribution of octaves in tiling. Tiles of the same track (in Figure, "A, B and C" are different tracks) are such that the fundamental frequencies of the associated notes are the same for points of same relative position on different tiles. For example: the fundamental frequencies of the notes associated to the points in dark gray, in the track A, are identical, whereas those of the notes associated to the points in dark gray, in the track B, are in an octave above (that is, the fundamental frequency is twice that of the corresponding notes in the track A). Thus, there is redundancy of notes of the same fundamental frequency in such representation, as happens in stringed instruments in general. Therefore, in the case the tonic is C note, the tiles in the track A (respectively, B and C) of FIG. 16 have notes taken from octave A (respectively, B and C) of the piano, shown in that Figure. Thus, the number of tracks which are intended to present will depend not only on the size of the screen and tiles, but also on the availability of audible notes, and possibly on other factors, such as those of aesthetic nature, for example.

Figure 13:
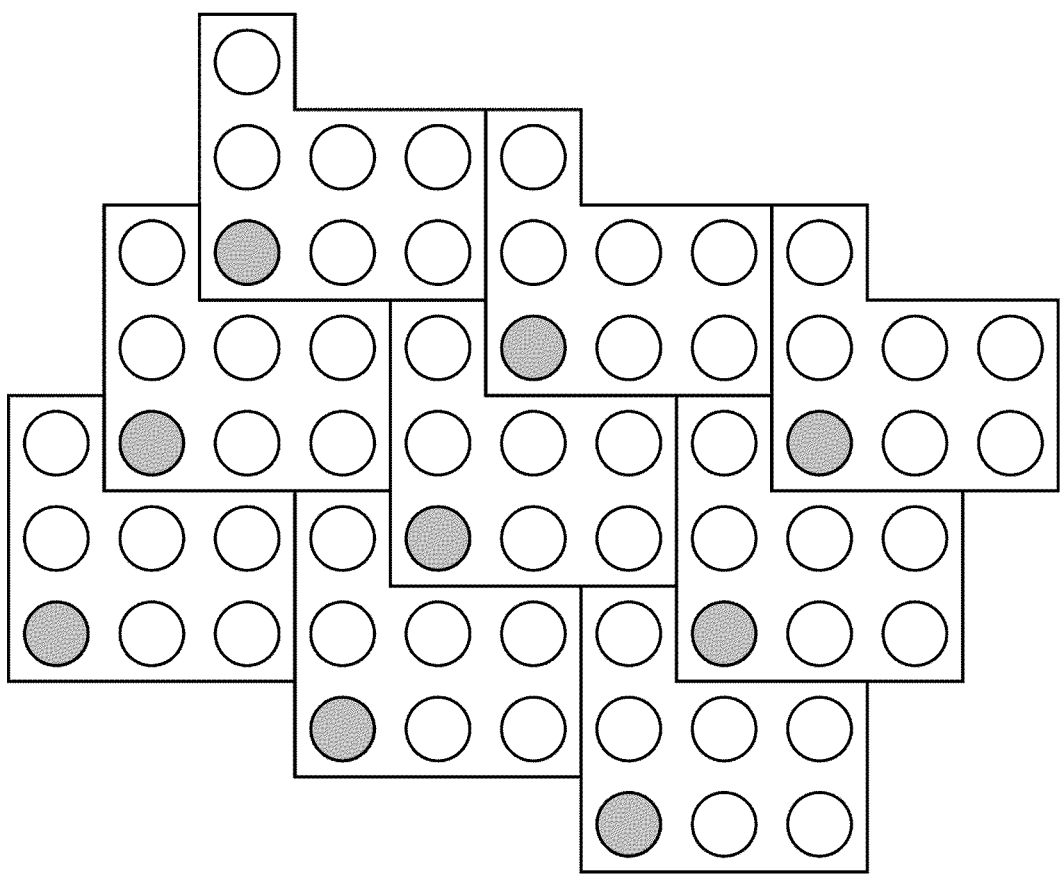
FIG. 13—Analogous to FIG. 11, for heptatonic scales.
Figure 14:
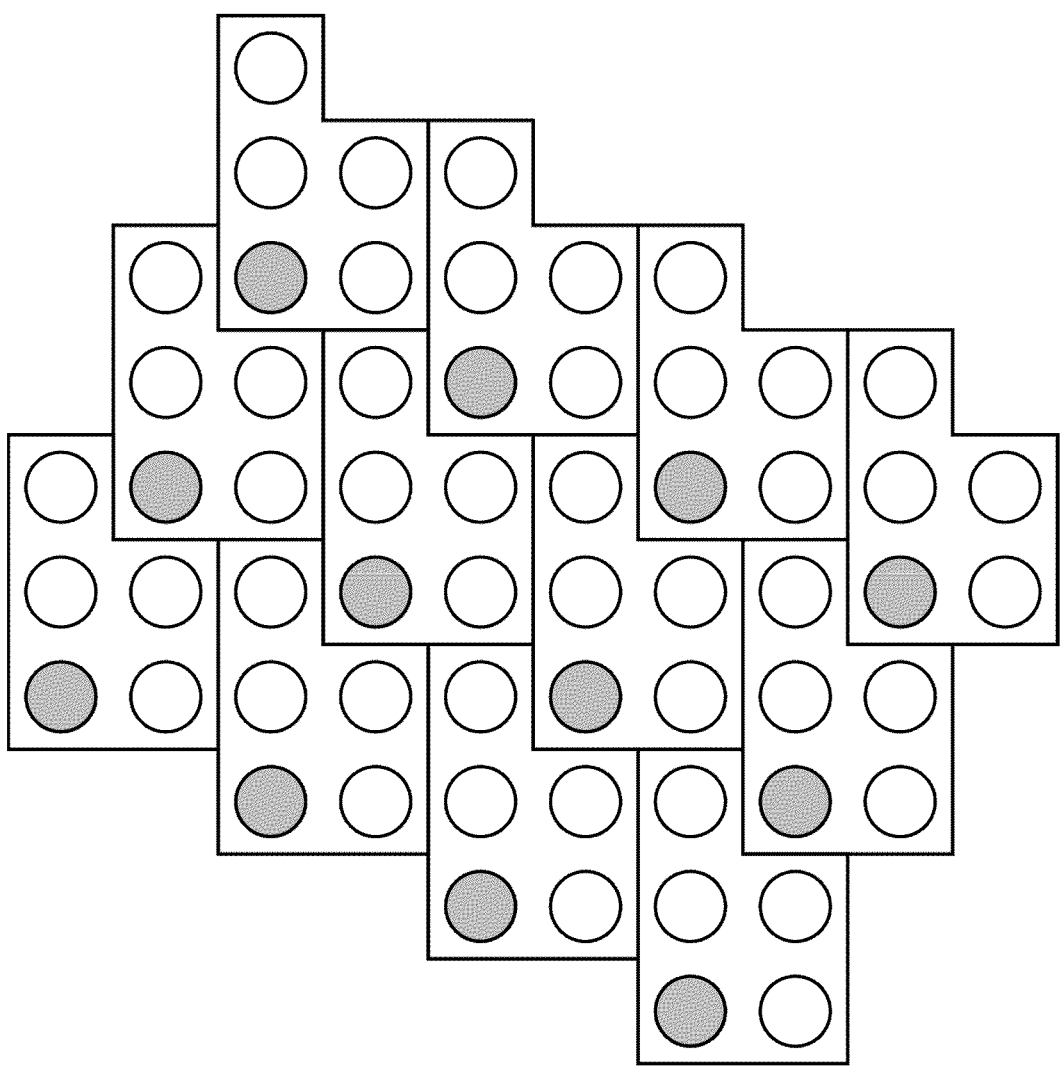
FIG. 14—Analogous similar to FIG. 11, for pentatonic scale.
Figure 15:
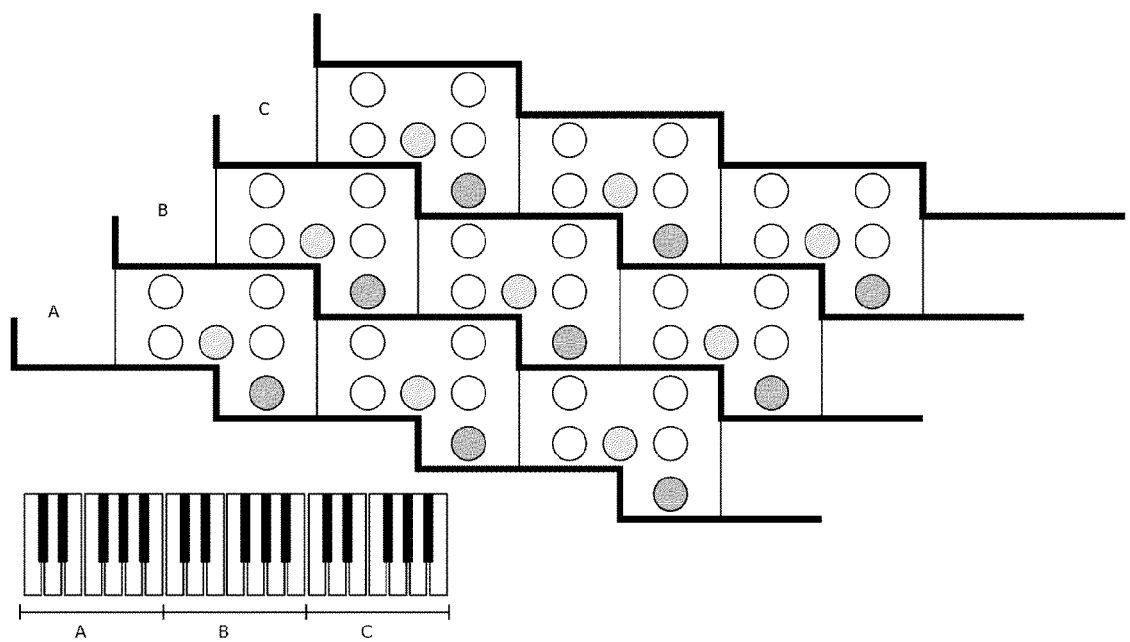
FIG. 15—Figure which shows the relationship between the octaves of a piano ans the octaves in the representation, by tiling, of the Major Blues scale. Tiles of the same track are such that the fundamental frequencies of the associated notes are the same for points of the same related position in different tiles. For example: the fundamental frequencies of notes triggered by the dark gray points in the track A are identical, while those of the notes triggered by dark gray points in track B are in an octave above (i.e., the fundamental frequency is twice that of the corresponding notes in track A).
Figure 19:
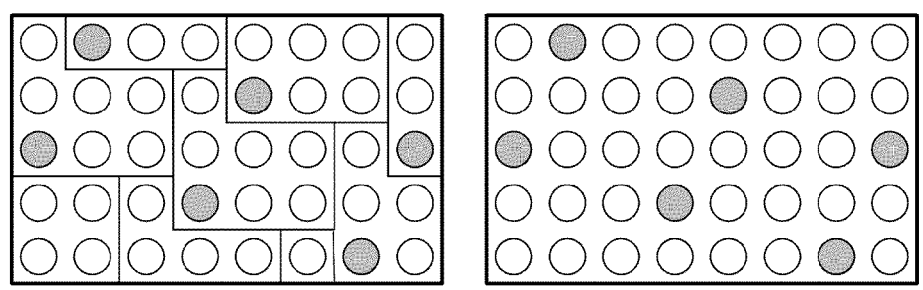
FIG. 19—Figure that illustrates how tiling could be represented for the heptatonic scales, by selecting a rectangle of points of the tiling, as shown in FIG. 3.

After executing the tiling, it is subtracted the region that, in fact, it is intended to present to the user. This region typically has a rectangular shape, as illustrated in FIG. 19 in case of a tiling with heptatonic scale tiles (see FIG. 13). The dashes indicating the edges of the tiles may or may not be presented, and the visual properties that differ the tonic notes and, if present, the Blue-note, from the other notes may vary and may be a different filling color (gray, blue, etc.), an additional circle (concentric), among others (see FIG. 22).

Example of Application of the Method

It was used as standard for the interface projected here the notes of a very common scale, in the musical genre of the Blues: the Blues Minor scale.

Figure 20:
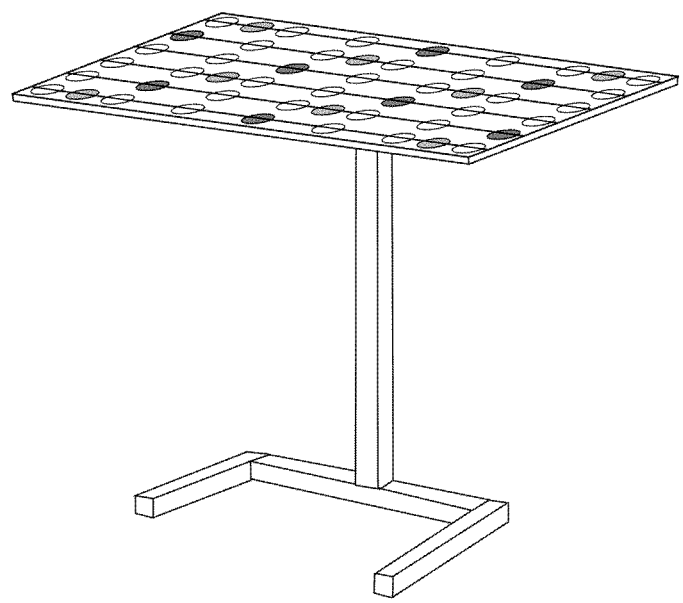
FIG. 20 A—Figure which shows the electronic musical entertainment device that is merely a multi-touch table with some strings.
Figure 20:
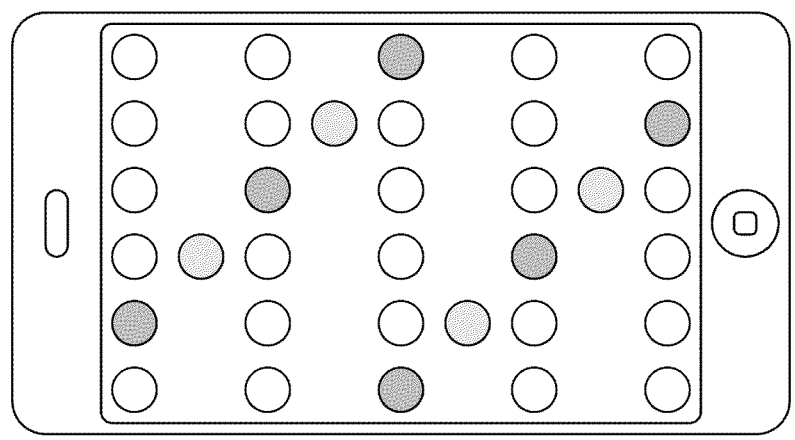

The electronic musical entertainment device is just a multi-touch table with some strings (like, for example, a guitar) wherein the scale notes are designed, as the tiling technique previously described (see FIG. 20 A). Thus, the musician can compose and play music without the risk of leaving the musical scale.

As an example, the inventors created the entertainment device for the Blues musical style, and the instrument was called "Blues Machine".

The Blues musical style presents the following elements, which are frequently used: a progression of chord of 12-measures and the Minor Blues scale. A progression of chords of 12-measures commonly used is the following: I-I-I-I—IV-IV-I-I—V-IV-I-V (where the Roman numerals represent grades with respect to the fundamental chord). In relation to the notes of the Blues scale, the most used are those of the Minor Blues scale, as described in FIG. 9. As an example, if the main chord is C the chord progression may be C-C-C-C—F-F-C-C—G-F-C-G, and the Blues scale may be C, D#, F, F#, G, A#.

Usually, a beginner in guitar needs to learn how to improvise on the Blues scale (see FIG. 21) by listening to the Blues base on 12 measures.

Besides the several standards that must be learned, an additional difficulty is that the guitarist cannot "turn off" the notes that are outside the Blues scale, which would prevent typing wrong, even that in terms of improvising, everything is possible.

Despite such difficulties, the guitar, itself, is an extremely rich instrument, since the musicians are challenged to play different effects, especially "bend", "hammer-on", "pull-off" and "slides" in the Blues music. Therefore, the present invention sought to preserve such possibilities in a computer musical instrument.

Hence the project of creating an electronic musical device with multi-touch interface: multi-touch interfaces allow the implementation of such musical effects.

Figure 21:
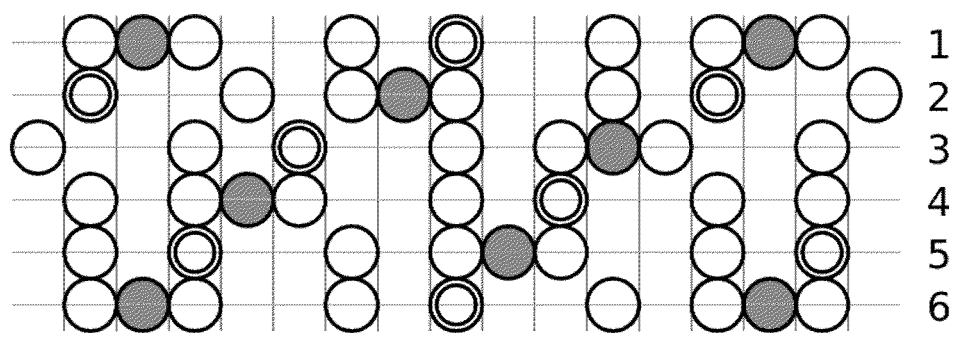
FIG. 21—Figure which shows the Blues scale, for the interface of a guitar, where the tonics are notes with two concentric circles and the blue-note's are the filled circles.
Figure 22:
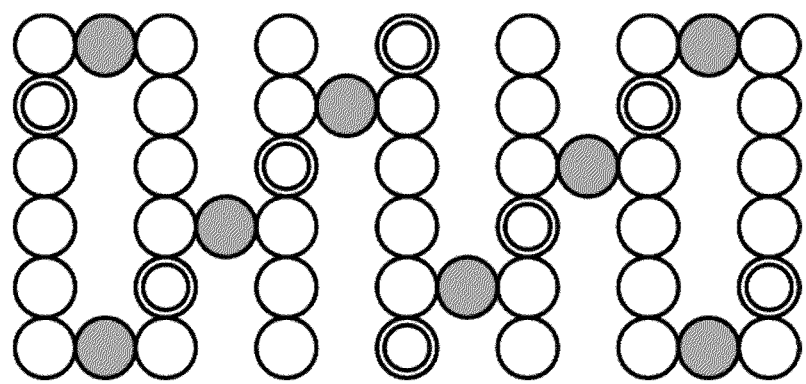
FIG. 22—Figure which shows the particular tiling of the Minor Blues scale for the notes shown in FIG. 21.

And in order to simplify the presentation, apparently without regularity, of FIG. 21, that the representations herein emerged. FIG. 22 illustrates how the notes represented on FIG. 21 would be arranged by using the technique of tiling (with the tiles of Blues scale) presented herein.

Figure 23:
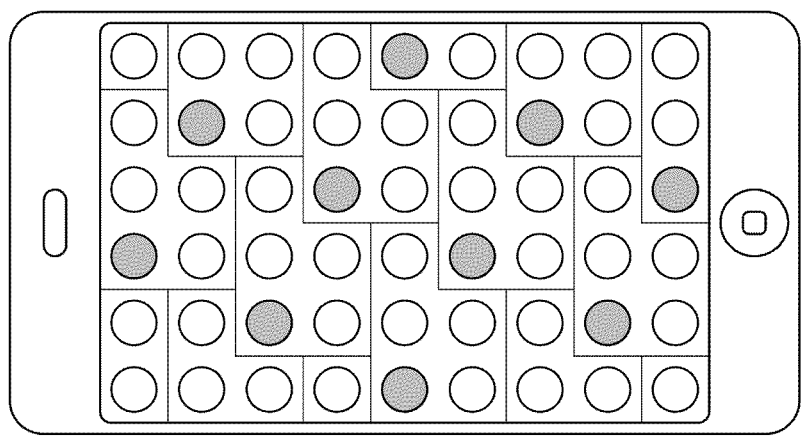
FIG. 23 A—Analogous to FIG. 20 B, for the representation of pentatonic scale.
Figure 23:
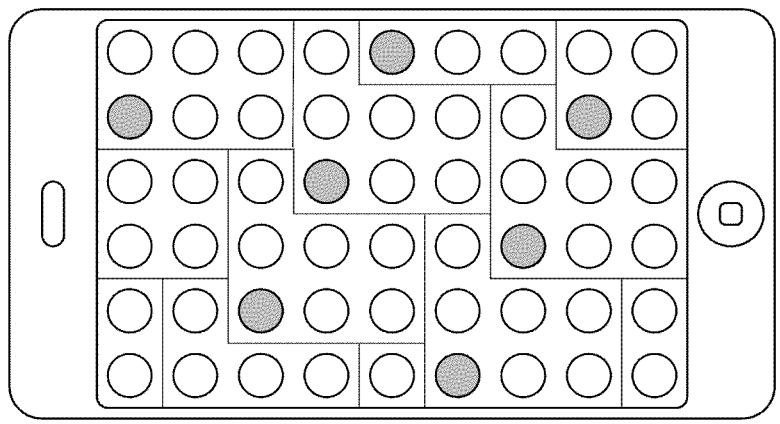

The electronic musical device was implemented either (i) on a table and (ii) on a smart-phone, as can be seen in FIGS. 20 A and 20 B. Additionally, it is important that the developed method and device, described in more detail to the musical style of the Blues, can also be extended to other styles where pentatonic, heptatonic, Major Blues or Minor Blues scales are used. An example can be seen in FIGS. 23 A (pentatonic scales) and 23 B (heptatonic scales).

Those skilled in the art, therefore, will immediately value the major benefits which arise from the present invention.

Variations in the form of realizing the inventive concept exemplified herein should be understood as within the spirit of the invention and of the attached claims.

What is claimed is:

1. Method of representing musical scales on a multi-touch and two-dimensional interface, the method comprising:
assigning each note of a specific scale to a region in a tile with one octave per tile, wherein each tile comprises a plurality of regions arranged from left to right and from bottom to top in order of the notes of the scale assigned thereto, starting with a tonic note of the scale,
wherein each of tiles have the same shape
tiling the tiles such that the regions are linearly-oriented throughout the tiles,
distinguishing a region where the tonic note is assigned from the rest, and
overlapping an image of strings on the interface such that each of the strings runs across respective regions,
wherein the number of musical notes to be presented will depend both on the interface size and on the tiles, and on the selected region, as well as on the availability of the audible notes of the instrument.

2. The method according to claim 1, wherein the specific scale is selected form the group consisting of pentatonic (arbitrary scales of 5 notes), heptatonic (arbitrary scales of 7 notes), Major Blues (a specific scale of 6 notes) and Minor Blues (a specific scale of 6 notes).

3. The method according to claim 1, wherein the two-dimensional interface enables simulation of musical effects by slightly changing a fundamental frequency of the note corresponding to a touched point or an intensity (sound power) of the note.

4. The method according to claim 3, wherein the musical effects are a bend, a hammer-on, a pull off, and a slide and the simulation of musical effects is accomplished by moving the touched point on the interface, or by changing the pressure to the interface surface, respectively.

5. The method according to claim 2, wherein the tiles are tiled such that notes assigned to the regions linearly adjacent each other in the left-right direction are successive notes of the scale.

6. The method according to claim 5, wherein a fourth note of the scale is assigned to a region immediately above the region where the tonic note is assigned for the heptatonic and a third note of the scale is assigned to a region immediately above the region where the tonic note is assigned for the pentatonic.

7. The method according to claim 6, wherein the region immediately above the region where the tonic note is assigned is orthogonally-oriented with the region where the tonic note is assigned.

8. The method according to claim 6, wherein the region immediately above the region where the tonic note is assigned is not orthogonally-oriented with the region where the tonic note is assigned.

9. The method according to claim 1, wherein a distance between adjacent regions in the left-right direction and a distance between adjacent regions in the bottom-top direction are same.

10. The method according to claim 1, wherein a distance between adjacent regions in the left-right direction and a distance between adjacent regions in the bottom-top direction are different.

11. The method according to claim 1, wherein the octave has a number of notes selected from the group consisting of 5, 6, and 7.

12. An electronic musical device, comprising:
a multi-touch and two-dimensional interface, and
a plurality of tiles allocated on a surface of the interface, wherein each tile has a same shape and comprises a plurality of regions,
wherein notes of a specific scale are assigned to a region in each tile with one octave per tile from left to right and from bottom to top in order of the notes of the scale assigned thereto, starting with a tonic note of the scale,
a sound of the assigned notes of the specific scale is emitted by touching the respective regions, and
the plurality of tiles is tiled such that the regions are linearly-oriented throughout the tiles and notes assigned to the regions linearly adjacent each other in the left-right direction are successive notes of the scale, and
a region where the tonic note is assigned is distinguished from the rest.

13. The electronic musical device according to claim 12, wherein the multi-touch and two-dimensional interface is flexible or non-flexible.

14. The electronic musical device according to claim 12 further comprising an image of strings on the interface, said image of the strings runs across respective regions.

15. The electronic musical device according to claim 12, further comprising an interface element that increase the tangibility degree to the user.

16. The electronic musical device according to claim 15, wherein the interface element is guitar strings stretched on lines of the matrices of which naturally appear between the tiles.

17. The electronic musical device, according to claim 12, wherein the multi-touch and two-dimensional interface is a table top.

18. The electronic musical device according to claim 12, wherein a fundamental frequency of the note corresponding to the touched region and intensity of the sound is slightly changed by moving the touched point on the interface, or by changing the pressure to the interface surface, respectively.

19. The electronic musical device according to claim 12, wherein the specific scale is selected form the group consisting of pentatonic (arbitrary scales of 5 notes), heptatonic (arbitrary scales of 7 notes), Major Blues (a specific scale of 6 notes) and Minor Blues (a specific scale of 6 notes).

20. The electronic musical device according to claim 12, wherein the tiles are tiled such that notes assigned to the regions linearly adjacent each other in the left-right direction are successive notes of the scale.

21. The electronic musical device according to claim 12, wherein a fourth note of the scale is assigned to a region immediately above the region where the tonic note is assigned for the heptatonic and a third note of the scale is assigned to a region immediately above the region where the tonic note is assigned for the pentatonic.

22. The electronic musical device, according to claim 12, wherein the region immediately above the region where the tonic note is assigned is orthogonally-oriented with the region where the tonic note is assigned.

23. The electronic musical device according to claim 12, wherein the region immediately above the region where the tonic note is assigned is not orthogonally-oriented the region where the tonic note is assigned.

24. The electronic musical device according to claim 12, wherein a distance between adjacent regions in the left-right direction and a distance between adjacent regions in the bottom-top direction are same.

25. The electronic musical device according to claim 12, wherein a distance between adjacent regions in the left-right direction and a distance between adjacent regions in the bottom-top direction are different.

26. A method of playing music using the electronic musical device according to claim 12 comprising touching the region.

27. The method of playing music according to claim 26 wherein more than one note is generated at the same time by touching the more than one region.

28. The method of playing music according to claim 26 further comprising moving the touched point on the interface, or by changing the pressure on the interface surface so as to change a fundamental frequency of the note corresponding to a touched point or an intensity of the note.

\* \* \* \* \*